US012617101B2

(12) United States Patent  
Hardi et al.

(10) Patent No.: US 12,617,101 B2  
(45) Date of Patent: May 5, 2026

(54) PROGRAMMABLE ROBOT

(71) Applicants: Airbus Operations Limited, Bristol (GB); The Manufacturing Technology Centre Limited, Coventry (GB)

(72) Inventors: Robin Hardi, Bristol (GB); Harvey Brookes, Bristol (GB); John Mumford, Bristol (GB); Richard Cameron Blain, Bristol (GB)

(73) Assignees: Airbus Operations Limited, Filton (GB); The Manufacturing Technology Centre Limited, Coventry (GB)

( * ) Notice: Subject to any disclaimer, the term of this patent is extended or adjusted under 35 U.S.C. 154(b) by 258 days.

(21) Appl. No.: 18/383,979

(22) Filed: Oct. 26, 2023

(65) Prior Publication Data

US 2024/0286292 A1 Aug. 29, 2024

(30) Foreign Application Priority Data

Oct. 31, 2022 (GB) ..................................... 2216136

(51) Int. Cl.  
*B25J 11/00* (2006.01)  
*B25J 5/02* (2006.01)  
(Continued)

(52) U.S. Cl.  
CPC .............. *B25J 11/005* (2013.01); *B25J 5/02* (2013.01); *B25J 9/1664* (2013.01); *B25J 13/088* (2013.01)

(58) Field of Classification Search  
CPC . B25J 11/005; B25J 5/02; B25J 9/1664; B25J 13/088; B25J 9/1687; B25J 9/1692;  
(Continued)

(56) References Cited

U.S. PATENT DOCUMENTS 4,590,578 A * 5/1986 Barto, Jr. ................. B21J 15/10  
700/192  
5,297,238 A * 3/1994 Wang ..................... B25J 9/1697  
700/254

(Continued)

FOREIGN PATENT DOCUMENTS

DE 102015014625 A1 5/2016

OTHER PUBLICATIONS

British Search Report for Application No. 2216136 dated Apr. 28, 2023.

(Continued)

*Primary Examiner* — Jaime Figueroa  
(74) *Attorney, Agent, or Firm* — KDW Firm PLLC

(57) ABSTRACT

A programmable robot is configurable between a measuring configuration, in which a probe is operable, and a machining configuration, in which a tool is operable. The robot includes a carrier for carrying the probe and the tool, a position sensing arrangement for determining coordinate data, and a controller 7. The controller is configured to cause the carrier, in the measuring configuration, to move the probe to each of a plurality of reference features in a template held in a first orientation by a jig, wherein feedback via the probe enables the position sensing arrangement to determine coordinate data associated with the reference features. The controller is configured to, based on the determined data, cause the carrier, in the machining configuration, to return to each position corresponding to each reference feature location and machine a workpiece held in the first orientation.

15 Claims, 3 Drawing Sheets

(51) Int. Cl.
    *B25J 9/16*             (2006.01)
    *B25J 13/00*          (2006.01)
    *B25J 13/08*          (2006.01)

(58) Field of Classification Search
    CPC ... B25J 11/00; B25J 13/00; B25J 19/02; B25J
            9/1669; B25J 9/1679; B25J 9/1694; B25J
            13/081; G05B 2219/31031; G05B
            2219/40033; G05B 19/41805; B64F 5/10
    USPC ................. 700/245–264; 318/568.11–568.25
    See application file for complete search history.

(56)             References Cited

U.S. PATENT DOCUMENTS

| | | | | |
|---|---|---|---|---|
| 5,949,685 | A * | 9/1999 | Greenwood | G05B 19/404 |
| | | | | 700/71 |
| 6,681,145 | B1 * | 1/2004 | Greenwood | B25J 9/1692 |
| | | | | 700/193 |
| 6,980,881 | B2 * | 12/2005 | Greenwood | G05B 19/401 |
| | | | | 318/560 |
| 9,897,993 | B2 * | 2/2018 | Kanazawa | G05B 19/404 |
| 10,987,767 | B2 * | 4/2021 | Pringle, IV | B21J 15/44 |
| 11,524,407 | B2 * | 12/2022 | Otsuki | B25J 9/10 |
| 11,752,562 | B2 * | 9/2023 | Rancic | B25J 11/006 |
| | | | | 409/8 |
| 11,827,453 | B2 * | 11/2023 | Wagner | B65G 1/1378 |
| 12,306,638 | B2 * | 5/2025 | Fetzer | B25J 9/1697 |
| 2004/0260422 | A1 * | 12/2004 | Greenwood | B25J 9/1692 |
| | | | | 700/193 |
| 2008/0154428 | A1 * | 6/2008 | Nagatsuka | B25J 9/1656 |
| | | | | 700/258 |
| 2014/0365061 | A1 * | 12/2014 | Vasquez | G05B 19/401 |
| | | | | 901/44 |
| 2015/0248125 | A1 * | 9/2015 | Kanazawa | G05B 19/19 |
| | | | | 700/193 |
| 2016/0158940 | A1 * | 6/2016 | Brockway | B25J 9/1687 |
| | | | | 901/41 |
| 2017/0235301 | A1 * | 8/2017 | Atohira | G05B 19/42 |
| | | | | 700/254 |
| 2018/0104820 | A1 * | 4/2018 | Troy | B25J 17/0208 |

OTHER PUBLICATIONS

Ple Pascal et al., "Force Controlled Robotic System for Drilling and Riveting One Way Assembly," SAE International Journal of Aerospace, vol. 4, No. 2, Jun. 15, 2011, pp. 785-788.
Eguti Carlos et al., "Development of a Robotic End-Effector of Drilling and Fasteners Inserter for Aircraft Structures," SAE Technical Papers, vol. 1, Sep. 18, 2012.
Weidong, Zhu et al., "Measurement error analysis and accuracy enhancement of 2D vision system for robotic drilling," Robtics and Computer-Integrated Manufacturing, vol. 30, Issue 2, 2014, pp. 160-171.
Biao Mei et al., "Accurate positioning of a drilling and riveting cell for aircraft assembly," Robotics and Computer- Integrated Manufacturing, vol. 69, 2021.
European Search Report for Application No. 231991969 dated Mar. 19, 2024.

\* cited by examiner

PROGRAMMABLE ROBOT

TECHNICAL FIELD

The disclosure herein relates to a programmable robot. More particularly, but not exclusively, the disclosure herein concerns a programmable robot to determine a first set of coordinate data associated with a plurality of reference features in a template held by a jig, and, on the basis of the determined data, to return to each position corresponding to each reference feature location and machine a first workpiece held by the jig. The disclosure herein also concerns a machining system comprising the programmable robot, an aircraft comprising an aircraft structure machined by the programmable robot, a method of machining using a programmable robot, and a computer program comprising instructions, which, when the program is executed by a computer, cause the computer to carry out the method.

BACKGROUND

Workpieces can be assembled together by individually machining a matching pattern of features (such as a hole pattern) in each workpiece and coupling the workpieces using fasteners (for example, bolts) through matching features (such as holes). In some applications, such as the manufacture of components in the aerospace industry, a high degree of precision is required in matching relative locations of the features in the respective workpiece. Some manual processes with high accuracy can be inefficient from a manufacturing standpoint and can hold up the assembly line.

Typically, a template, unintended for assembly, can be used to transfer a hole pattern to a workpiece that is intended for assembly into the final product, for example, an aircraft. The template, comprising the hole pattern, is overlaid on the workpiece and fixed in position relative to the workpiece once accurately aligned. Each hole in the hole pattern of the template is used as a guide for the direction and location of the hole to be drilled. Each hole is drilled into the workpiece located below the template using a drill. The drill is manually moved to each other hole location while the template remains firmly fixed in place. In some instances, it can be impractical and/or time consuming to overlay the template and ensure the template is held relative to the workpiece throughout the drilling process.

Alternatively, a machine can be programmed using data about the hole pattern to be formed in the workpiece from design drawing data, such as a CAD file. The hole pattern is then transferred to the workpiece directly using the design drawing data. Although the physical template is not used, inaccuracies inherent to the machine may go undetected, which could result in a mismatch of respective hole locations and/or entire hole patterns.

SUMMARY

The disclosure herein seeks to mitigate the above-mentioned problems. Alternatively or additionally, the disclosure herein seeks to provide an improved programmable robot, machining system comprising a programmable robot, method of machining using a programmable robot, and/or method of machining an aircraft structure.

The disclosure herein provides, according to a first aspect, a programmable robot. The robot is configurable between a measuring configuration, in which a probe is operable, and a machining configuration, in which a tool is operable. The robot may comprise a carrier for carrying the probe and the tool. The robot may comprise a position sensing arrangement for determining coordinate data and optionally, position information about the carrier. The robot may comprise a controller. The controller may be configured to cause the carrier, in the measuring configuration of the robot, to move the probe to each one of a plurality of reference features in a template. The template may be held in a first orientation by a jig (for example, according to a first datum). Feedback via the probe interacting with the template at each reference feature location may enable the position sensing arrangement to determine a first set of coordinate data associated with the plurality of reference features, and optionally, a first set of positions of the carrier associated with the plurality of reference features. On the basis of the determined first set of coordinate data and/or the determined first set of positions of the carrier, the controller may cause the carrier, in the machining configuration of the robot, to return to each position of the carrier corresponding to each reference feature location and optionally machine, using the tool, a first workpiece held in the first orientation optionally by the jig or another jig (for example, according to the first datum determined by the first orientation of the template).

Programmable robots, in accordance with the disclosure herein, may learn information about a predetermined pattern of features (for example, a hole pattern) and use the learnt information to directly transfer at least one aspect of the pattern of features to a workpiece. Such robots may be regarded as a machine that programmes itself under instructions from the controller. Such robots may increase the accuracy of pattern transfer compared to known processes because the same robot is used and the repeatability of the same robot is utilized to transfer a pattern of features (for example, a hole pattern) from the template to the workpiece. Additionally or alternatively, such robots may provide an improved machining process that suitably balances accuracy and speed. For example, such robots that break the mechanical link between the template and the workpiece when machining the workpiece have been found by the inventors to reduce assembly times while maintaining a high degree of accuracy.

The controller may be configured to cause the carrier, using the tool, to machine the first workpiece to reproduce at least an aspect of the plurality of reference features in the first workpiece. The reproduction may comprise reproducing, in the first workpiece, a location (such as a center) and a size of each of the plurality of reference features formed in the template. The reproduction may comprise machining a feature in the first workpiece that is different in form to the reference feature, on the basis of an aspect of the reference feature, such as a hole center. That is, for example, the feature in the template may be something different to a hole (for example, a protrusion or a spike) and the workpiece may be correspondingly machined to form a hole (for example, corresponding to the protrusion or spike).

The controller may cause the carrier, in the machining configuration of the robot, to return to each position of the carrier based on an offset associated with the tool.

The feature may be or may comprise a hole, such as a blind hole or a through-hole. The feature may comprise a recess, such as a spherical recess. The feature may facilitate the coupling of the first workpiece with another workpiece. Each feature may have a shape that complements a shape of a corresponding feature in another workpiece such that the features may be coupled by mechanically mating.

The feedback via the probe may be feedback via the probe directly interacting with the template, for example touching a surface of the template. The feedback via the probe may be via the probe interacting with a surface (for example a wall) of the reference feature and/or with a surface of the template around the feature.

The position sensing arrangement may comprise a position sensor for indicating a position of the probe. The position sensing arrangement may comprise a determiner for determining coordinate data based on information received from the position sensor and/or for determining position information about the carrier.

The template may be referred to as an artefact. The template may be a representative workpiece. The template may be used for observation and may be unsuitable as a component for assembly of a final product, for example, a vehicle, such as an aircraft. The template may be defined as an item that is restricted to workshop use and is not intended as a vehicle structure, such as an aircraft structure.

The template may comprise a main body and a plurality of inserts. The main body may comprise a different material to the plurality of inserts. The main body may comprise a composite. The main body may comprise carbon and/or a polymer. The main body made comprise carbon fibre reinforced plastic. The plurality of inserts may comprise a metal. The main body may be mechanically less temperature sensitive than the plurality of inserts. The main body may comprise a material that has a low coefficient of expansion compared to a coefficient of expansion of the plurality of inserts. Each insert may define the feature. For example, when the feature is a through-hole, the insert may comprise a bore defining the through-hole.

The controller may cause the carrier, in the machining configuration of the robot, to machine, using the tool, a first workpiece held by the jig with the template absent from the jig. That is, the robot may be configured to machine the first workpiece without the tool passing through the template. The carrier may be powered by a motor or a plurality of motors to move the carrier. The carrier may comprise a moveable arm that moves relative to a base. The moveable arm may move by translation and/or rotation. The carrier may comprise a plurality of joints. The moveable arm may comprise the plurality of joints. The moveable arm may comprise an articulated arm, wherein the articulated arm comprises the plurality of joints. Determining position information about the carrier may comprise determining position information about the plurality of joints.

The controller may be configured to cause the carrier, in the measuring configuration of the robot, to move the probe to each one of the plurality of reference features with reference to a common datum, for example, via the common datum. The controller may be configured to cause the carrier, in the machining configuration of the robot, to return to each position of the carrier via the common datum. Such robots that return to a common datum have been found to be beneficial because they improve accuracy, and/or a balance of accuracy and speed, of pattern transfer, for example by reducing inaccuracies caused by movement of the robot itself, such as a backlash. The common datum may be a location of one of the plurality of reference features, such as a center of that feature.

The controller may be configured to determine the first set of coordinate data by determining a vector of each one of the plurality of reference features in the template. The controller may be configured to cause the carrier to machine the first workpiece along a direction of the determined vector associated with each one of the plurality of reference features.

The controller may be configured to cause the carrier, in the measuring configuration of the robot, to move the probe to each one of a plurality of reference features by first moving to an indicated reference feature location according to predetermined coordinate data, such as CAD data. The controller may be configured to cause the carrier, to thereafter move the probe to an actual reference feature in the template held in the first orientation by the jig by searching for the actual reference feature through the feedback via the probe interacting with the template at each reference feature location.

The determined first set of coordinate data may comprise coordinates of a center of each one of the plurality of reference features. The determined first set of coordinate data may comprise coordinates of multiple points on a perimeter of each one of the plurality of reference features, for example, three points per feature. The determined first set of coordinate data may comprise a diameter of each one of the plurality of reference features.

The diameter of one feature (for example, one hole and/or through-hole) in the template may be different to the diameter of one other feature. The diameter of the feature may be greater than 10 mm and/or less than 30 mm, for example 20 mm. Each one of the plurality of reference features in the template may be permanently fixed such that their relative location cannot change. Each feature may comprise a diameter, and a location relative to each other feature, that is to be directly matched with the first workpiece and/or a second workpiece.

The controller may be configured to repeat the steps associated with the first workpiece for a second workpiece that is provided separately to the first workpiece and is subsequently coupleable (for example, coupled using fasteners or mated through complementary features) to the first workpiece using the machined locations.

The controller may be configured to cause the carrier, in the measuring configuration of the robot, to move the probe to each one of the plurality of reference features in the template held in a second orientation by the jig (for example, according to a second datum). Feedback via the probe interacting with a different side of the template at each reference feature location enables the position sensing arrangement to determine a second set of coordinates associated with the plurality of reference features, and optionally, a second set of positions of the carrier associated with the plurality of reference features. The template may be reversible, such that the different side may be a reverse side of the template. On the basis of the determined second set of coordinate data, and/or the determined second set of positions of the carrier, the controller may cause the carrier, in the machining configuration of the robot, to return to each position of the carrier corresponding to each reference feature location. The controller may cause the carrier to machine, using the tool, the second workpiece held in the second orientation optionally by the jig or the other jig (for example, according to the second datum determined by the second orientation of the template), such that the first workpiece and the second workpiece can be coupled together (for example, by fasteners such as bolts) through respectively machined locations. For example, the first workpiece and the second workpiece may be machined to have matching feature patterns to enable the first workpiece and the second workpiece to be coupled by the fasteners through matching feature locations. The first workpiece and the second workpiece may be machined to have feature patterns to enable the first workpiece and the second workpiece to be mated through mating feature locations. The controller may be configured to cause the carrier, using the tool, to machine the second workpiece to reproduce the plurality of reference features in the second workpiece. The reproduction may comprise reproducing, in the second workpiece, a location (such as a center) and a size of each of the plurality of reference features formed in the template.

The first datum and/or second datum may comprise an orientation, such as a reference plane of the template. The reference plane may be determined based on a location of three or more features, such as three or more hole centers. The first datum and/or second datum may comprise a position, such as a coordinate position of a reference feature of the template, such as a center of the reference feature. The first datum and/or second datum may comprise a reference position of the jig. The first datum and/or second datum may be a common reference position on the jig or jigs.

The tool may be a cutter, for example a drill or milling tool, such that the first workpiece may be machined by cutting (for example, drilling or milling) a feature (for example, a hole) in the first workpiece using the cutter (for example, the drill or the milling tool), and/or the second workpiece may be machined by cutting (for example, drilling or milling) a feature (for example, a hole) in the second workpiece using the cutter (for example, the drill or the milling tool).

The robot may comprise a memory to store the determined first set of coordinate data, the determined first set of positions, the determined second set of coordinate data, and/or the determined second set of positions. The memory may store information about a position, orientation, and/or path of the carrier. The path of the carrier may comprise a series of movements. The series of movements may comprise linear and/or rotational movements. The memory may store information about the first datum, second datum, and/or common datum. The robot may comprise: a transmitter for sending information to a remote memory; and a receiver for receiving information from a remote memory.

A pattern formed by the plurality of reference features in the template may be an irregular pattern. The plurality of reference features in the template may comprise at least 50 or at least 100 features. The features may be of the same type, such as holes, or comprise a plurality of types such as holes and recesses. The plurality of reference features may be mostly around a perimeter of the template. Once machined, machined locations in the workpiece may be mostly around a perimeter of the workpiece.

According to a second aspect of the disclosure herein, a machining system is provided. The machining system may comprise a programmable robot according to the first aspect. The machining system may comprise a template. The template may comprise a plurality of features. The machining system may comprise a jig. The jig may be for holding the template and a first workpiece, and/or a second workpiece. The machining system may comprise a second programmable robot according to the first aspect. The machining system may comprise a second template comprising a plurality of features. The machining system may comprise a second jig. The second jig may be for holding the first workpiece. The second jig may be for holding the second template and the second workpiece. The plurality of features of the template may match the plurality of features of the second template. Such machining systems have been found to be beneficial because they improve accuracy, and/or a balance of accuracy and speed, of feature pattern transfer.

The or each jig may comprise a backing plate. The template may be indirectly held by the jig for example, by another member, such as the backing plate or the first workpiece or the second workpiece. The template may be fixed to the backing plate and held by the jig with the backing plate. The or each jig may comprise a structure fixed to a floor and a removable frame portion. The template and backing plate may be fixed to the removable frame portion, such that when the removable mount is mounted to the structure the template is oriented and held in a first orientation.

The or each jig may comprise a plurality of adjusters. The first workpiece and/or second workpiece may be held by the jig by the plurality of adjusters. The template may be fixed to the first workpiece or second workpiece by a fixing arrangement. The fixing arrangement may space the template from the first workpiece or second workpiece by a first distance that is used by the programmable robot when operable in the machining configuration.

The machining system may comprise a memory. The robot may comprise the memory. The memory may be a remote memory, located physically away from the robot. The robot may comprise: a transmitter for sending information to the remote memory; and a receiver for receiving information from the remote memory. The memory may store coordinate data, for example, a determined first set of coordinate data and/or a determined second set of coordinate data, for example, as determined by the programmable robot according to the first aspect. The memory may store information about a position, orientation, and/or path of a carrier of the robot. For example, the memory may store the determined first set of positions of the carrier and/or the determined second set of positions of the carrier. The memory may store information about a first datum, second datum, and/or common datum.

According to a third aspect of the disclosure herein, a method of machining (for example, cutting, such as drilling) using a programmable robot is provided. The method may comprise a first mode of operation and a second mode of operation. Under instruction from a controller, in the first mode of operation, the method may comprise moving a probe by a carrier to a plurality of reference features in a template held in a first orientation by a jig. Under instruction from the controller, in the first mode of operation, the method may comprise determining a first set of coordinate data associated with the plurality of reference features by a position sensing arrangement in response to feedback via the probe interacting with the template at each reference feature location, and optionally, a first set of positions of the carrier associated with each reference feature. Under instruction from the controller, in the second mode of operation, the method may comprise returning the carrier to each position of the carrier corresponding to each reference feature location using the determined first set of coordinate data and/or the determined first set of positions of the carrier. The returning may comprise retracing a series of movements of the carrier. Under instruction from the controller, in the second mode of operation, the method may comprise machining (for example, cutting such as drilling), using a tool (for example, a cutter such as a drill), a first workpiece (for example, a feature such as a hole in the first workpiece) held in the first orientation optionally by the jig or another jig based on a returned position of the carrier. Such methods have been found to be beneficial because they improve accuracy, and/or a balance of accuracy and speed, of feature pattern transfer.

The machining may comprise machining the first workpiece to reproduce the plurality of reference features in the first workpiece. The reproduction may comprise reproducing, in the first workpiece, a location (such as a center) and a size of each of the plurality of reference features formed in the template.

The method may comprise removing the template from the jig after determining the first set of coordinate data, such that the template is absent from the jig when subsequently machining using the tool, (for example, cutting (such as drilling) each feature such as a hole) the first workpiece held in the first orientation by the jig based on the returned position of the carrier.

The method may comprise repeating the first and second modes of operation using a different (for example, a reverse) side of the template, held in a second orientation by the jig, and using a second workpiece, such that the first workpiece and the second workpiece can be coupled together (for example, by fasteners such as bolts) through respectively machined locations. For example, the machining may comprise machining the second workpiece to reproduce the plurality of reference features in the first workpiece. The reproduction may comprise reproducing, in the second workpiece, a location (such as a center) and a size of each of the plurality of reference features formed in the template.

The method may comprise, in the first mode of operation, resetting the carrier from each position of the carrier corresponding to each reference feature location to a common datum along a path. The method may comprise, in the first mode of operation, returning the carrier to each position of the carrier corresponding to each reference feature location from the common datum along the path (that is, the same path). Such robots that return along the same path have been found to be beneficial because they improve accuracy of feature pattern transfer, for example by reducing inaccuracies caused by movement of the robot itself, such as a backlash.

According to a fourth aspect of the disclosure herein, a method of machining (for example, cutting, such as drilling) an aircraft structure (for example, a wing structure) is provided. The method may comprise mounting an artefact in a jig to provide a datum. The method may comprise determining, using a programmable robot, coordinate data of a plurality of reference features in the artefact and orientation information of the robot (such as a carrier to carry a probe and a tool) associated with each one of the plurality of reference features, such as a set of positions of the robot (such as the carrier) associated with the plurality of reference features. The method may comprise replacing the artefact mounted in the jig with an aircraft structure according to the datum. The method may comprise re-orientating the programmable robot based on the orientation information of the robot (such as the carrier) associated with each one of the plurality of reference features. The method may comprise machining, using a tool (for example, a cutter such as a drill), the aircraft structure (for example, a feature such as a hole in the aircraft structure) at each location corresponding to each one of the plurality of reference features in the artefact. Such methods have been found to be beneficial because they improve accuracy, and/or a balance of accuracy and speed, of feature pattern transfer.

The machining may comprise machining the aircraft structure to reproduce the plurality of reference features in the aircraft structure. The reproduction may comprise reproducing, in the first workpiece, a location (such as a center) and a size of each of the plurality of reference features formed in the artefact.

The method may comprise repeating the mounting, determining, replacing, re-orientating, and machining using a second jig, second programmable robot, and second aircraft structure, as required, such that the first and second aircraft structures can be coupled through matching machined feature locations.

The datum may comprise an orientation, such as a reference plane of the artefact. The reference plane may be determined based on a location of three or more features, such as three or more hole centers. The datum may comprise a position, such as a coordinate position of one of the plurality of reference features of the artefact, such as a center of that reference feature.

According to a fifth aspect of the disclosure herein, an aircraft comprising an aircraft structure is provided. The aircraft structure may be machined (for example, cut such as drilled) by the programmable robot according to the first aspect and/or according to the method of the second aspect and/or third aspect. The aircraft structure may be an aircraft structure comprising a plurality of features formed by the programmable robot. The aircraft structure may be a wing structure, for example, at least one of an outer wing box and a central wing box.

According to a sixth aspect of the disclosure herein, a computer program comprising instructions is provided. The computer program, which, when the program is executed by a computer, may cause the computer to carry out the method according to the second aspect and/or third aspect.

According to a seventh aspect of the disclosure herein, a computer-readable storage medium is provided. The computer-readable storage medium may comprise instructions, which, when executed by a computer, cause the computer to carry out the method according to the second aspect and/or third aspect.

DETAILED DESCRIPTION

It will of course be appreciated that features described in relation to one aspect of the disclosure herein may be incorporated into other aspects of the disclosure herein. For example, any one of the methods of the disclosure herein may incorporate any of the features described with reference to the programmable robot and/or machining system of the disclosure herein and vice versa.

Embodiments of the disclosure herein will now be described by way of example only with reference to the accompanying schematic drawings of which:

DETAILED DESCRIPTION

Figures 1, 2:
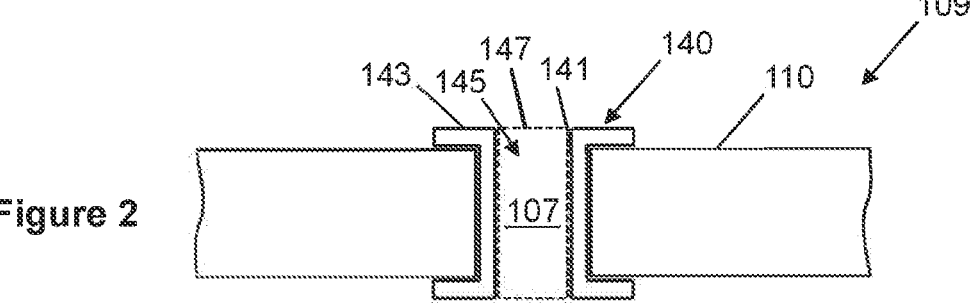
FIG. 1 shows a schematic view of a machining system comprising a programmable robot according to a first embodiment of the disclosure herein.
FIG. 2 shows a schematic view of a cross-section of an insert according to the first embodiment of the disclosure herein.

FIG. 1 shows a schematic view of a machining system 100 according to a first embodiment. The machining system 100 comprises a programmable robot 1, a template 109, a jig 111, a first workpiece 113, and a second workpiece 115. The template 109, first workpiece 113, and second workpiece 115 comprise a planar surface that is to be machined (for example, drilled) by the robot 1. The first workpiece 113 is an outer wingbox (OWB) and the second workpiece 115 is a central wingbox (CWB). Each of the OWB and the CWB are examples of a wing structure. The OWB and the CWB are assembled together to enable the wing of an aircraft to be attached to the fuselage of the aircraft.

The term "template" refers to something that supports the manufacturing process but does not form part of the manufactured product. Example of a manufactured product include a vehicle structure, such as an aircraft structure (for example, a wing structure, such as the OWB or the CWB), and a vehicle (for example, an aircraft). Another term for the template is an "artefact". In contrast, the term "workpiece" refers to something that forms part of the manufactured product. The workpiece is worked on, with support from the template, and may be assembled to other workpieces to form an assembly of workpieces. The template is a tool to assist the manufacture of the workpiece and subsequent assembly of the workpieces.

The jig 111 is a fixture to hold an orientation of at least one object, such as the template 109, first workpiece 113, and/or second workpiece 115. The jig 111 comprises a structure formed by a lower frame portion 116, a first side frame portion 117, a second side frame portion 119, an upper frame portion 120 a backing plate 112, four supports 131, 132, and twelve adjusters 121, 122. The backing plate 112 is made from aluminum to provide stability for the template 109. The structure forms an adjustable frame within which the template 109, first workpiece 113, and/or second workpiece 115 can be mounted, adjusted, and set. The jig 111 is bolted to a workshop floor 150 by a series of bolts 118 coupled to the respective side frame portions 117, 119 to provide stability (two bolts 118 are shown for illustration purposes, and one is associated with each side frame portion 117, 119).

The jig 111 comprises a locating arrangement. The locating arrangement comprises a locating member 126 attached to each of the side frame portions 117, 119, and a base 128 that is wider than the respective locating member 126. The upper frame portion 120 is mounted on the base 128 and the locating member 126 extends through holes in the upper frame portion 120 to prevent relative movement of the upper frame portion 120 with respect to the side frame portions 117, 119.

The upper frame portion 120 comprises four extensions 124 extending towards the floor 150. The backing plate 112 is fixed to the four extensions 124 by two fixing arrangements 129. The object, being the template 109 in FIG. 1, is also fixed to the backing plate 112 by the two fixing arrangements 129. The upper frame portion 120 is thus rigidly fixed to the backing plate 112 and the template 109.

The four supports 131, 132 comprise two side supports 131 and two lower supports 132. The four supports 131, 132 support the backing plate 112 and the template 109. The twelve adjusters 121, 122 comprise six side adjusters 121 (three on each side) and six lower adjusters 122.

The arrangement and number of supports 131, 132 and/or adjusters 121, 122 may vary, and four supports 131, 132 and twelve adjusters 121, 122 are shown by way of example. In practice, the number of adjusters 121 may depend on the size and/or rigidity of the template 109, backing plate 112, and/or first and second workpieces 113, 115, and the number of adjusters 121 will likely exceed thirty.

Although only two fixing arrangements 129 are shown, the number of fixing arrangements 129 used to fix the template 109 to the backing plate 112 can be significantly more than two.

The robot 1 comprises a carrier 3, a position sensing arrangement 5, a controller 7, and a memory 9. The position sensing arrangement 5 comprises a position sensor 11, and a determiner 13. The controller 7 is configured to operate the carrier 3.

Although not shown, the carrier 3 comprises an articulated arm and several joints to manipulate the articulated arm. The carrier 3 is configured to carry each of a probe 103, and a drill 105. In this embodiment, the carrier 3 is configured to carry the probe 103 and the drill 105 at any one time. The probe 103 is unloaded when not required and the drill 105 is loaded in place of the probe 103. The process of switching between the probe 103 and drill 105 is performed automatically, although that process can be performed manually. The probe 103 is a touch-sensitive probe that indicates when the probe 103 contacts a surface.

The carrier 3 is a multiple axis positioning system. The carrier 3 is controllable about six axes of control, comprising three linear axes and rotation about each of those axes. Such a system is known as a parallel kinematic machine (PKM). The controller 7 can precisely control a position of the carrier 3 and thus the position of the probe 103 or drill 105 depending on the configuration of the robot 1.

The carrier 3, position sensing arrangement 5, controller 7, and memory 9 are electrically connected to each other to enable electrical signals to be transferred between each other and allow the robot 1 to internally communicate. The position sensor 11 indicates a position of the probe 103 and the determiner 13 determines coordinate data based on information received from the position sensor 11. The position of the probe 103 comprises the positions of the articulated arm about the joints and the positions of the joints.

The template 109 comprises a reference hole pattern 123 formed by eleven through-holes 107, 108. Once machined, the first workpiece 113 comprises a first matching hole pattern 125, and the second workpiece 115 comprises a second matching hole pattern 127. The template 109 is reversible such that each side of the template 109 presents the hole pattern 125 as a mirror image of the other side of the template 109.

The arrangement and number of the through-holes 107, 108 in the reference hole pattern 123 may vary, and eleven through-holes 107, 108 are shown by way of example. In practice, the through-holes 107, 108 will be scattered in a non-linear fashion and not arranged as a grid as shown in FIG. 1, and the number of through-holes 107, 108 will likely exceed one hundred, although that is dependent on the application of the respective workpiece.

As shown by FIG. 2, the template 109 comprises a main body 110. The main body 110 is made of a composite material comprising carbon-fibre-reinforced-polymer (CFRP). A benefit of CFRP is that the template 109 has temperature stability, for example, compared to metal. The template 109 also comprises inserts 140 that are permanently fixed to the main body 110 of the template 109. An example insert 140 is shown in FIG. 2. Each insert 140 comprises a bore 145 which defines the through-hole 107, 108. When fixing each insert 140 to the template 109, a central region 147 of the insert 140 is removed to form the bore 145.

The main body 110 of the template 109 is 23 mm thick; however, the through-holes 107, 108 are 25 mm deep because each through-hole 107, 108 is formed by the insert 140 and the insert 140 has a length greater than the thickness of the template 109.

The view in FIG. 2 is a cross-section of the template 109 taken along a longitudinal axis of the bore 145 of the insert 140 and in the thickness direction of the main body 110. The insert 140 comprises two hexagonal ends 143, one at each end of the bore 145. The insert 140 is made of metal. A benefit of using metallic inserts 140 is to provide a highly accurate surface finish compared to the CFRP with which the probe 103 can measure. This enables a wall 141 of the bore 145 and hexagonal ends 143 of the inserts 140 to be smooth and stable and the hexagonal ends 143 to be accurately planar.

The robot 1 is configurable between a first, measuring configuration, in which the probe 103 is operable, and a second, machining configuration, in which the drill 105 is operable. In the measuring configuration, the robot 1 collects information about the template 109, such as coordinate data of a multiplicity of points around an edge of each hole 107, 108. That coordinate data may be used to determine further coordinate data associated with a center of each hole. In the machining configuration, the robot 1 machines the workpiece using the determined coordinate data collected by measuring the template 109.

The process of transferring the reference hole pattern 123 from the template 109 to the first workpiece 113 and the second workpiece 115 is now described.

The template 109 is mounted in the jig 111, in a first orientation, by fixing the template 109 to the backing plate 112 and the upper frame portion 120. The twelve adjusters 121, 122 are not used in this process. The robot 1 is positioned relative to the jig 111 to a known location relative to the robot 1 and jig 111.

In the measuring configuration, the robot 1 determines a datum associated with the template 109 by measuring an orientation (a datum plane) and a location (a datum point) of the template 109. This enables the robot 1 to learn where the template 109 effectively sits in the space above the workshop floor 150. The orientation comprises a plane of a planar surface of the template 109 and the location comprises a location of one or more of holes 107, 108, such as one of the holes in each corner of the template 109 (it has been found that the further apart the measurements are taken, the more accurately the datum plane is determined). The plane can be determined using coordinate information associated with three of the through-holes 107, 108, for example three of the through-holes, 107, 108 that are furthest from each other. The process of obtaining the datum plane is part of a "3-2-1" measuring process, whereby three points are measured in one plane, two points in another plane, and one point in a third plane. The controller 7 causes the carrier 3 to move the probe 103 to enable the probe 103 to interact with the template 109. Based on feedback from the probe 103 touching surfaces of the template 109, the datum plane and datum point of the template 109 are established and recorded in the memory 9.

In the measuring configuration, the robot 1 learns a location of each hole 107, 108 in the reference hole pattern 123 relative to the datum point. Firstly, the controller 7 causes the carrier 3 to move the probe 103 to a location of a first hole 107, as indicated by CAD data, and according to the datum point of the template 109. Typically, the first hole 107 will be located close to the location of the datum point and may be the hole that is closest to the datum point. In this embodiment, the first hole 107 is in a corner of the template 109. In some embodiments, a center of the first hole 107 is used as the datum point.

Due to tolerances inherent to the robot 1 and/or the template 109, for example, the actual location of the first hole 107 may vary from the indicated location of the first hole 107. Nevertheless, the robot 1 learns the actual location of the first hole 107 when starting from the indicated location. The robot 1 does this by measuring the surface around the first hole 107 before automatically finding the first hole 107, entering the first hole 107 and measuring a perimeter of the first hole 107 at a fixed depth of the first hole 107, for example anything up to the thickness of the template 109 (such as 65 mm which is the thickness of the template 109 in this embodiment). The controller 7 is programmed to cause the carrier 3 to move the probe 103 automatically as required to find the first hole 107 and take the necessary measurements.

The robot 1 measures sixteen points in total for each hole. For example, the robot 1 measures: six points around the hole, to ascertain a plane of a surface of the template 109 at an end of the first hole 107; five points around the perimeter of the inside of the hole at a first depth, to ascertain a first center of the first hole 107 at the first depth; and five points around the perimeter of the inside of the hole at a second depth, to ascertain a second center of the first hole 107 at the second depth, wherein a line between the first and second centers within the bore of the first hole 107 establishes a vector of the first hole 107. Using information from the position sensor 11, the determiner 13 determines coordinate data associated with the first hole 107, such as a direction of the first hole 107 (for example, a direction of a central axis of the first hole 107, although that may be taken from the orientation of the template 109 as a whole), a location of a center of the first hole 107, and/or a diameter of the first hole 107. The robot 1 also determines a position of the carrier 3 corresponding to the center of the first hole 107, and that information is stored in the memory 9. The controller 7 causes the carrier 3 to return to a common datum point along a path, and the path along which the carrier 3 moves to the common datum point is stored in the memory 9. Thus, the controller 7 can cause the carrier 3 to approach a learned position of the carrier 3 associated with the first hole 107 (and to do the same for each subsequent hole 108).

It has been found that using a common datum point mitigates problems associated with backlash of the robot 1, for example (wherein the term "backlash" describes the degree of play between parts of the robot 1). Recording the path of the robot 1 and subsequently following that path (the approach of the tool (which may comprise a predetermined overshoot), such as the drill) further mitigates problems associated with backlash of the robot 1.

The robot 1 repeats the process of learning an actual location of each subsequent hole 108 in the reference hole pattern 123 using the CAD data and determining information about a center of each subsequent hole 108, a position of the carrier 3, and a path to the common datum point. Each time, the controller 7 causes the carrier 3 to return to the same common datum point. The coordinate data associated with the center of each subsequent hole 108, the position of the carrier 3 at the center, and the path by which the controller 7 causes the carrier 3 to move from the common datum point to the center of each subsequent hole 108, is captured for use in the machining configuration of the robot 1.

Figure 3:
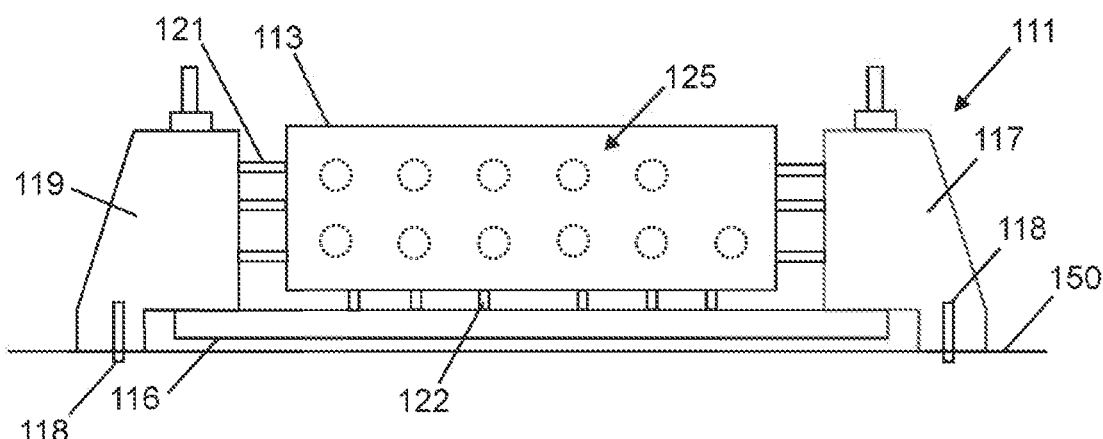
FIG. 3 shows a second schematic view of the machining system according to the first embodiment of the disclosure herein.

Once a first set of coordinate data and first set of positions of the carrier 3 associated with the holes 107, 108 of the template 109 have been obtained, the robot 1 is arranged in the machining configuration such that the drill 105 is operable. Also, the template 109 and backing plate 112 are unmounted from the jig 111 by removing the upper frame portion 120 from the locating members 126. The first workpiece 113 is mounted in the jig 111 in place of the template 109 and the upper frame portion 120, as shown in FIG. 3. Without moving the base 116 of the jig 111 from the workshop floor 150, the first workpiece 113 is oriented and located using the twelve adjusters 121, 122 according to the datum plane associated with the template 109. The twelve adjusters 121, 122 work collectively to hold a position and orientation of first workpiece 113 in the jig 111. The six side adjusters 121 hold a horizontal position. The six lower adjusters 121 hold a vertical position.

Once the first workpiece 113 is in position according to the datum plane and the robot 1 is in the machining configuration, the controller 7 causes the carrier 3 to move to the location of the first workpiece 113 for drilling the first hole 107. For some workpieces, a surface of the workpiece may be milled to bring the surface of the workpiece to the datum plane. The controller 7 causes the carrier 3 to return from the common datum point and travel along the same path that was recorded for the first hole 107 of the template 109. The carrier 3 is thus put in the same position associated with the first hole 107 of the template 109 based on the determined coordinates of the hole center of the first hole 107 of the template 109 and the determined position of the carrier 3. The carrier 3 returns to the previous position of the carrier 3 based on the determined coordinates of the hole center even if new coordinates when returning are offset from the determined coordinates. This enables the robot 1 to replay the position of the carrier 3 according to where the robot 1 sees that position to utilize the repeatability of the mechanical workings of the robot 1. The robot 1 uses the coordinates when determining the positions but disregards those coordinates when returning in favor of the determined positions. Once the carrier 3 is in position, the controller 7 causes the drill 105 to be operated to drill a hole in the first workpiece 113 according to the determined diameter of the first hole 107 (with the template 109 absent). Once drilled, the first hole 107 of the template 109 is effectively transferred to the first workpiece 113. The robot 1 repeats these steps for each of the multiplicity of holes 107, 108 of the reference hole pattern 123 to produce the first matching hole pattern 125 in the first workpiece 113.

Once operation on the first workpiece 113 is complete, the first workpiece 113 is unmounted from the jig 111 and the template 109 is reloaded into the jig 111 in the same manner as previously performed for the template 109. This time, however, the template 109 is effectively flipped such that the template 109 is held by the upper frame portion 120 of the jig 111 in a second, reverse orientation. For illustration purposes, the straight dotted line in FIG. 1 indicates a notional axis of rotation of the template 109 and the curved arrow around the dotted line indicates a direction of rotation when flipping.

The process established for the first workpiece 113 is effectively repeated for the second workpiece 115. For example, the robot 1 is positioned relative to the jig 111 to a known location relative to the robot 1 and jig 111. In the measuring configuration, the robot 1 determines a datum associated with the reverse side of the template 109 by measuring an orientation (a datum plane or reference plane) and location (a datum point) of the reverse side of the template 109. This enables the robot 1 to learn where the reverse side of the template 109 effectively sits in the space above the workshop floor 150. Based on feedback from the probe 103 touching a surface of the reverse side of the template 109 under instruction from the controller 7, the datum plane and datum point of the template 109 are established and recorded in the memory 9.

In the measuring configuration, the robot 1 once again learns a location of each hole 107, 108 in the reference hole pattern 123 relative to the datum point. The method is the same as the described above for the first workpiece 113 and so is not repeated here for brevity.

Once a second set of coordinate data and second set of positions of the carrier 3 associated with the holes 107, 108 of the reverse side of the template 109 have been obtained, the robot 1 is put in the machining configuration such that the drill 105 is operable.

Once again, the template 109 is unmounted from the jig 111 and this time, the second workpiece 115 is mounted in place of the template 109. Without moving the base 116 of the jig 111 from the workshop floor 150, the second workpiece 115 is oriented and located using the twelve adjusters 121, 122 according to the datum plane associated with the reverse side of the template 109.

Once the second workpiece 115 is in position according to the datum plane, the robot 1, in the machining configuration, moves the carrier 3 to the location of the second workpiece 115 for drilling the first hole 107. The controller 7 causes the carrier 3 to return from the common datum point and travel along the same path that was recorded for the first hole 107 of the reverse side of the template 109. The controller 7 thus causes the carrier 3 to be put in the same position associated with the first hole 107 of the reverse side of the template 109 based on the determined coordinates of the hole center of the first hole 107 of the reverse side of the template 109 and the determined position of the carrier 3. The carrier 3 returns to the previous position of the carrier 3 based on the determined coordinates of the hole center even if new coordinates when returning are offset from the determined coordinates. This enables the robot 1 to replay the position of the carrier 3 according to where the robot 1 sees that position to utilize the repeatability of the mechanical workings of the robot 1.

The robot 1 uses the coordinates when determining the positions but disregards those coordinates when returning in favor of the determined positions. Once the carrier 3 is in position, the controller 7 causes the drill 105 to be operated to drill a hole in the second workpiece 115 according to the determined diameter of the first hole 107 (with the template 109 absent).

Once drilled, the first hole 107 of the reverse side of the template 109 is effectively transferred to the second workpiece 115. The robot 1 repeats these steps for each of the multiplicity of holes 107, 108 of the reference hole pattern 123 to produce the second matching hole pattern 127 in the second workpiece 115.

Once operation on the second workpiece 115 is complete, the second workpiece 115 is unmounted from the jig 111 such that the first and second workpieces 113, 115 can be coupled together by fasteners through the respective hole locations.

It has been found that such a robot 1, using the template 109 and the first and second workpieces 113, 115 in this way, provides the machining of a precise hole pattern in each of the first and second workpieces 113, 115. Such a robot 1 has been found to reduce manufacturing and/or assembly times, such as on the final assembly line of a vehicle, such as an aircraft.

Figure 4:
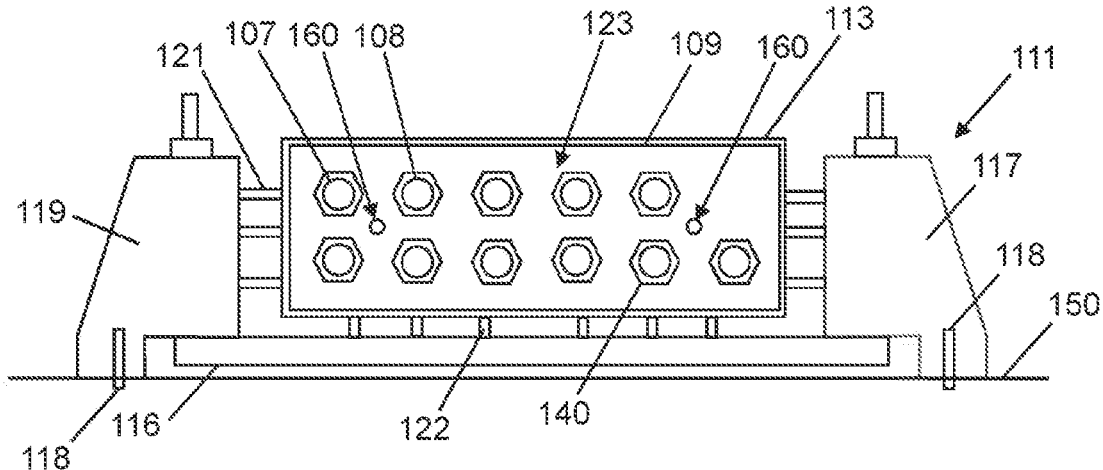
FIG. 4 shows a third schematic view of the machining system according to a second embodiment of the disclosure herein.
Figure 5:
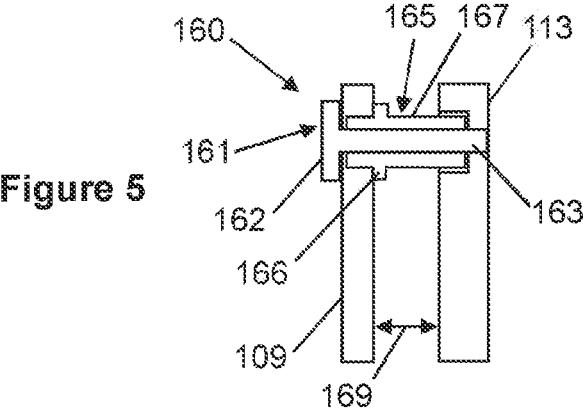
FIG. 5 shows a schematic cross-section view of a template coupled to a workpiece according to the second embodiment of the disclosure herein.

FIGS. 4 and 5 relate to a second embodiment and show a variation of the first embodiment. The inventors have recognised that the first workpiece 113 can be used in place of the backing plate 112 and upper frame portion 120. The second embodiment is thus the same as the first embodiment, except that the template 9 is fixed to the first workpiece 113 by two fixing arrangements 160. Only the differences between the first and second embodiments are discussed, and the same references are used to indicate the same features between the embodiments. The robot 1 is not shown for brevity because the robot 1 of the second embodiment is the same as the robot 1 of the first embodiment.

As shown in FIG. 5, each fixing arrangement 160 comprises a fastener 161 and a dowel 165. The fastener 161 comprises a head 162 and an elongated body 163 and the dowel 165 comprises a main body 167 and a protrusion 166. The elongated body 163 extends through a through-hole in the template 109 and through a countersunk through-hole in the first workpiece 113. The dowel 165 is secured to the fastener 161 by respective threaded portions and the protrusion 166 engages with the template 109 and the fastener is intimately fitted with the countersunk through-hole in the first workpiece 113. The dowel 165 spaces the template 109 and the first workpiece 113 by a first distance 169.

Instead of mounting the template 109 in the jig 11 using the backing plate 112 and the upper frame portion 120, the template 109 is mounted to the first workpiece 113 using the fixing arrangements 160. The first workpiece 113 provides stability to the template 109 in the same manner that the backing plate 112 provides stability to the template 109. The first workpiece 113 is oriented and located using the twelve adjusters 121, 122 and the robot 1, in the measuring configuration, determines a datum associated with the template 109 by measuring an orientation (a datum plane or reference plane) and location (a datum point) of the template 109. In the measuring configuration, the robot 1 learns a location of each hole 107, 108 in the reference hole pattern 123 relative to the datum point in the same manner as with the first embodiment.

Once a first set of coordinate data and first set of positions of the carrier 3 associated with the holes 107, 108 of the template 109 have been obtained, the robot 1 is put in the machining configuration such that the drill 105 is operable. Differently to the first embodiment, the first workpiece 113 remains in place in the jig 111 and the template 109 is removed from the first workpiece 113. The robot 1 then machines the first workpiece 113 in the same manner as with the first embodiment but takes the first distance 169 into account when approaching the first workpiece 113. Thus, the carrier 3 returns to the previous position of the carrier 3 based on the determined coordinates of the hole center and extends further according to the first distance 169.

Although the second embodiment is described in relation to the first workpiece 113, the same process applies for the second workpiece 115 in that the template 109 can be mounted to the first workpiece 113 using fixing arrangements 160, and, instead of mounting the template 109 in the jig 11 using the backing plate 112 and the upper frame portion 120, the template 109 can be mounted to the second workpiece 115 using the fixing arrangements 160.

Although only two fixing arrangements 160 are shown, the number of fixing arrangements 160 used to fix the template 109 to the first workpiece 113 can be significantly more than two.

Figure 6:
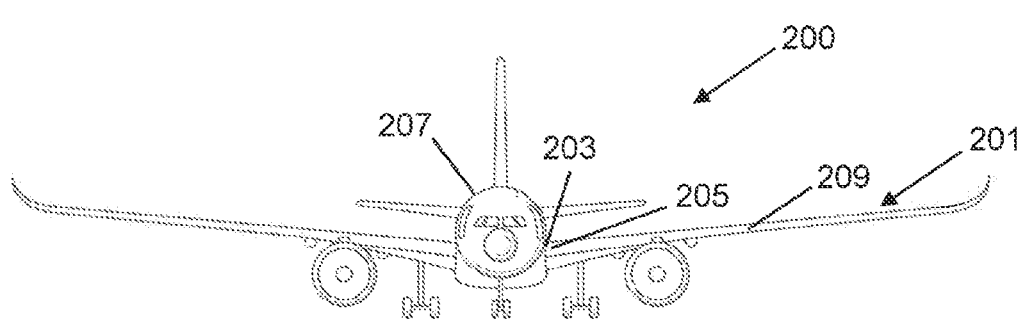
FIG. 6 shows a front view of an aircraft according to a third embodiment of the disclosure herein.

FIG. 6 shows an aircraft 200 according to a third embodiment. The aircraft 200 comprises a wing 201, a location 203 of a CWB, a location 209 of an OWB and a location 205 of a root end interface between the CWB and the OWB, and a fuselage 207. The CWB is part of the fuselage 207 and the OWB 205 is part of the wing 201. The wing 201 is fixed to the fuselage 207 by coupling the CWB and the OWB at the root end interface. Thus, each of the OWB and the CWB are examples of a wing structure.

Figure 7:
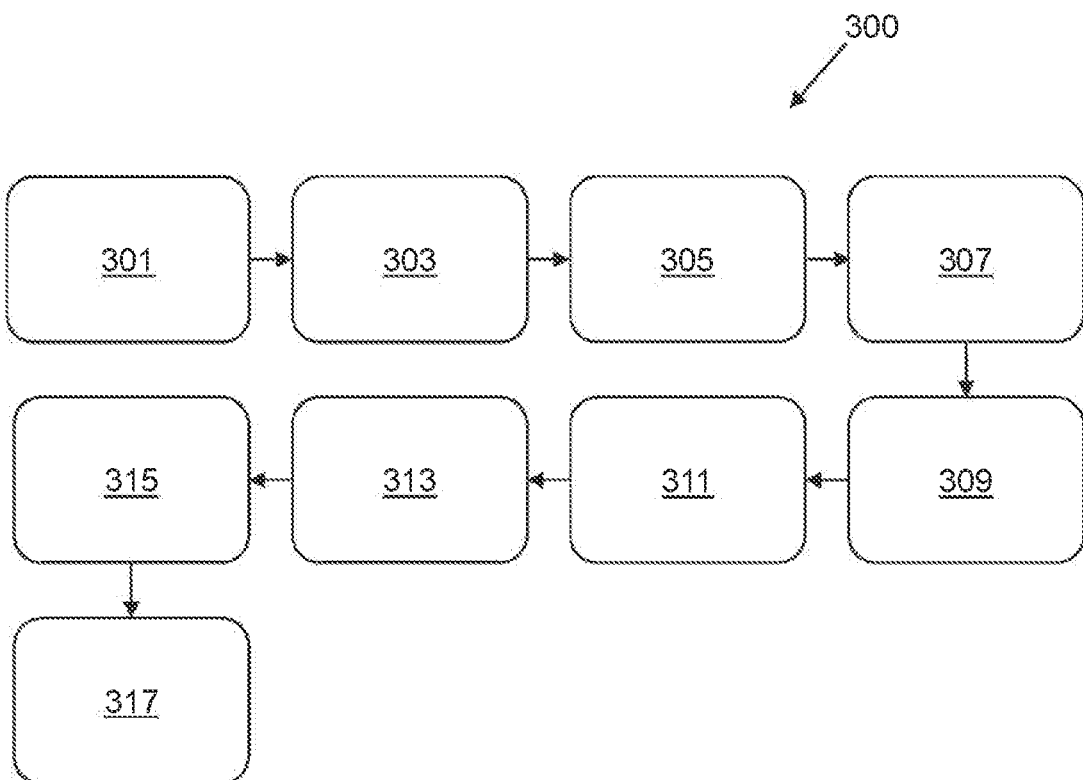
FIG. 7 shows an example method in accordance with the disclosure herein.

FIG. 7 shows a method 300 of machining, for example using the programmable robot 1 as described above according to the first embodiment.

The method 300 comprises mounting 301 a template in a jig, such as the template 109 and jig 111 of the first embodiment, to provide a datum (for example, a datum plane and or a datum point).

In a first mode of operation, the method 300 comprises moving 303 a probe by a carrier, such as the probe 103 and carrier 3 of the first embodiment, to a plurality of reference holes in a template held in a first orientation by the jig. The first mode of operation comprises determining 305 a first set of coordinate data associated with the plurality of reference holes by a position sensing arrangement in response to feedback via the probe interacting with the template at each reference hole location. An example position sensing arrangement is the position sensing arrangement 5 of the first embodiment. The first mode of operation optionally comprises determining orientation information of the robot associated with each one of the plurality of reference holes.

Optionally, in the first mode of operation, the method comprises resetting (not shown in FIG. 7) the carrier from each position of the carrier corresponding to each reference hole location to a common datum (for example, a common datum point) along a path, and returning the carrier to each position of the carrier corresponding to each reference hole location from the common datum along the path.

The method 300 comprises replacing 307 the template mounted in the jig with a first workpiece, such as the first workpiece 113 of the first embodiment, according to the datum.

In a second mode of operation, the method 300 comprises returning 309 the carrier to each position of the carrier corresponding to each reference hole location using the determined first set of coordinate data. Optionally, the robot is re-oriented based on the orientation information of the robot associated with each one of the plurality of reference holes. The first mode of operation comprises machining 311, using a tool (for example a drill, such as the drill 105 of the first embodiment), the first workpiece held by the jig based on a returned position of the carrier. The machining may comprise machining the first workpiece at each location corresponding to each one of the plurality of reference holes in the template.

Optionally, the method 300 comprises removing 313 the template from the jig after determining the first set of coordinate data, such that the template is absent from the jig when subsequently machining the first workpiece.

Optionally, the method 300 comprises repeating 315 the first and second modes of operation using a different side of the template (for example, a reverse side), held in a second orientation by the jig, and using a second workpiece.

Optionally, the method 300 comprises coupling 317 the first workpiece and the second workpiece together by fasteners through respectively machined locations.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

In some embodiments, the tool 105 may be different to a drill, for example an alternative cutting tool such as a milling tool. When a milling tool is used, the path of the robot 1 when milling comprises surface position data.

In some embodiments, the carrier 3 may be configured to carry the probe 103 and the drill 105 at the same time and to swap between the two.

In some embodiments, the carrier 3 may be controllable about less than or more than six axes of control, for example, the carrier 3 may be controllable about five axes of control or may be a Cartesian system controllable within a plane and about two axes of control.

Although the reference hole pattern 123 in the template 109 is schematically shown in FIG. 1 in a regular pattern, in reality the hole pattern may be irregular and the holes be arranged all over the template 109 (thus, the same applying to the first and second workpieces 113, 115). For example, the holes may be around a perimeter of the template 109.

In some embodiments, the memory 9 may be a remote memory positioned away from the robot 1 and the robot 1 may comprise a transmitter and receiver for sending and receiving information to and from the remote memory.

In some embodiments, the template 109, first workpiece 113, and second workpiece 115 comprise a non-planar surface that is to be machined (for example, drilled) by the robot 1.

In some embodiments, the probe 103 may be proximity probe such that a position of the probe 103 is based on a proximity to a surface rather than touching the surface.

In some embodiments, the template 109 and one of the first workpiece 113 or second workpiece 115 may be mounted in the jig 111 at the same time while the robot 1 is in the measuring configuration and the template 109 is removed when the robot is in the machining configuration.

In some embodiments, the robot 1 may measure more or less than sixteen points in total for each hole, including more or less than six points around the hole and more or less than five points within the hole at each depth (and at least three are required to obtain the hole center).

In some embodiments, a second template may be used for the second workpiece, rather than flipping the template 109 and using the same hole pattern on the reverse side of the template 109. This may occur, for example, when the template 109 comprises a pattern of features that is not formed by through-holes, for example the pattern of features on either the template 109 and/or the second template may comprise recesses. Alternatively, or additionally, this may occur when the workpieces to be machined are located at different manufacturing sites.

In some embodiments, the jig 111 comprises a supplementary support arrangement for the workpiece when the workpiece is requires supporting along its length to stabilise the workpiece. When the first or second workpiece is an OWB, for example, and is part of the wing of the aircraft the OWB is further supported by the supplementary support arrangement. The supplementary support arrangement provides ground support for the workpiece to prevent unwanted movement of the workpiece and hold the position of the workpiece.

Where in the foregoing description, integers or elements are mentioned which have known, obvious or foreseeable equivalents, then such equivalents are herein incorporated as if individually set forth. Reference should be made to the claims for determining the true scope of the present disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

It should be understood that modifications, substitutions, and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A programmable robot configurable between a measuring configuration, in which a probe is operable, and a machining configuration, in which a tool is operable, the robot comprising:
   a carrier for carrying the probe and the tool;
   a position sensing arrangement for determining coordinate data; and
   a controller configured to:
   cause the carrier, in the measuring configuration of the robot, to move the probe to each one of a plurality of reference features in a template held in a first orientation by a jig, such that feedback via the probe interacting with the template at each reference feature location enables the position sensing arrangement to determine a first set of coordinate data associated with the plurality of reference features; and
   on a basis of the determined first set of coordinate data, cause the carrier, in the machining configuration of the robot, to return to each position of the carrier corresponding to each reference feature location and machine, using the tool, a first workpiece held in the first orientation.

2. The programmable robot according to claim 1, wherein each reference feature of the plurality of reference features is a hole, such that the controller is configured to:
   cause the carrier, in the measuring configuration of the robot, to move the probe to each one of a plurality of reference holes in the template held in the first orientation by the jig, such that feedback via the probe interacting with the template at each reference feature location enables the position sensing arrangement to determine the first set of coordinate data associated with the plurality of reference features; and
   on the basis of the determined first set of coordinate data, cause the carrier, in the machining configuration of the robot, to return to each position of the carrier corresponding to each reference feature location and machine, using the tool, the first workpiece held in the first orientation.

3. The programmable robot according to claim 1, wherein the controller is configured to:
   cause the carrier, in the measuring configuration of the robot, to move the probe to each one of the plurality of reference features via a common datum, and cause the carrier, in the machining configuration of the robot, to return to each position of the carrier via the common datum.

4. The programmable robot according to claim 1, wherein the controller is configured to:

determine the first set of coordinate data by determining a vector of each one of the plurality of reference features in the template, and cause the carrier to machine the first workpiece along a direction of the determined vector associated with each one of the plurality of reference features.

5. The programmable robot according to claim 1, wherein the controller is configured to:

cause the carrier, in the measuring configuration of the robot, to move the probe to each one of the plurality of reference features by first moving to an indicated reference feature location according to predetermined coordinate data, that can be CAD data, and thereafter move the probe to an actual reference feature in the template held in the first orientation by the jig by searching for the actual reference feature through the feedback via the probe interacting with the template at each reference feature location.

6. The programmable robot according to claim 1, wherein the determined first set of coordinate data comprises coordinates of a center of each one of the plurality of reference features.

7. The programmable robot according to claim 1, comprising a memory to store the determined first set of coordinate data.

8. The programmable robot according to claim 1, wherein the controller is configured to:

cause the carrier, in the measuring configuration of the robot, to move the probe to each one of the plurality of reference features in the template held in a second orientation by the jig, such that feedback via the probe interacting with a different side of the template at each reference feature location enables the position sensing arrangement to determine a second set of coordinates associated with the plurality of reference features; and on a basis of the determined second set of coordinate data, cause the carrier, in the machining configuration of the robot, to return to each position of the carrier corresponding to each reference feature location and machine, using the tool, a second workpiece held in the second orientation, such that the first workpiece and the second workpiece can be coupled together through respectively machined locations.

9. A machining system comprising:

a programmable robot according to claim 1;

a template comprising a plurality of features; and a jig for holding the template.

10. A method of machining using a programmable robot, the method comprising, under instruction from a controller:

in a first mode of operation:

moving a probe by a carrier to a plurality of reference features in a template held in a first orientation by a jig; and determining a first set of coordinate data associated with the plurality of reference features by a position sensing arrangement in response to feedback via the probe interacting with the template at each reference feature location; and in a second mode of operation:

returning the carrier to each position of the carrier corresponding to each reference feature location using the determined first set of coordinate data, and machining, using a tool, a first workpiece held in the first orientation based on a returned position of the carrier.

11. The method according to claim 10, comprising removing the template from the jig after determining the first set of coordinate data, such that the template is absent from the jig when subsequently machining using the tool, the first workpiece held in the first orientation by the jig based on the returned position of the carrier.

12. The method according to claim 10, comprising repeating the first and second modes of operation using a different side of the template, held in a second orientation by the jig, and using a second workpiece, such that the first workpiece and the second workpiece can be coupled together by respectively machined locations.

13. The method according to claim 10, comprising, in the first mode of operation, resetting the carrier from each position of the carrier corresponding to each reference feature location to a common datum along a path, and returning the carrier to each position of the carrier corresponding to each reference feature location from the common datum along the path.

14. A method of machining an aircraft structure, the method comprising:

mounting an artefact in a jig to provide a datum;

determining, using a programmable robot, coordinate data of a plurality of reference features in the artefact and orientation information of the robot associated with each one of the plurality of reference features;

replacing the artefact mounted in the jig with an aircraft structure according to the datum;

re-orientating the robot based on the orientation information of the robot associated with each one of the plurality of reference features; and machining, using a tool, the aircraft structure at each location corresponding to each one of the plurality of reference features in the artefact.

15. A non-transitory computer-readable storage medium, the computer-readable storage medium including program code comprising programming instructions that when executed by a processing circuit cause the processing circuit to:

in a first mode of operation:

move a probe by a carrier to a plurality of reference features in a template held in a first orientation by a jig; and determine a first set of coordinate data associated with the plurality of reference features by a position sensing arrangement in response to feedback via the probe interacting with the template at each reference feature location; and in a second mode of operation:

return the carrier to each position of the carrier corresponding to each reference feature location using the determined first set of coordinate data, and machine, using a tool, a first workpiece held in the first orientation based on a returned position of the carrier.

* * * * *